(12) United States Patent
Chen

(10) Patent No.: US 12,085,255 B1
(45) Date of Patent: Sep. 10, 2024

(54) LAMP HAVING ILLUMINATING LIGHT PIPE WITH AXIAL ALIGNED PRISM OPTICS

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/422,172

(22) Filed: Jan. 25, 2024

(51) Int. Cl.
- F21S 43/237 (2018.01)
- B60Q 3/62 (2017.01)
- F21S 43/245 (2018.01)

(52) U.S. Cl.
CPC .............. *F21S 43/237* (2018.01); *B60Q 3/62* (2017.02); *F21S 43/245* (2018.01)

(58) Field of Classification Search
CPC ........ F21S 43/237; F21S 43/245; B60Q 3/62; B60Q 3/64; B60Q 3/66; G02B 6/001
See application file for complete search history.

(56) References Cited

U.S. PATENT DOCUMENTS

| | | | |
|---|---|---|---|
| 5,745,632 A * | 4/1998 | Dreyer | G02B 6/0096 359/833 |
| 11,220,210 B1 | 1/2022 | Chen | |
| 11,906,128 B1 | 2/2024 | Chen | |
| 2016/0347234 A1 | 12/2016 | Herbin et al. | |
| 2023/0175665 A1 | 6/2023 | Oku | |

FOREIGN PATENT DOCUMENTS

JP       2009271477 A     11/2009

* cited by examiner

*Primary Examiner* — Sean P Gramling
(74) *Attorney, Agent, or Firm* — Vichit Chea; Price Heneveld LLP

(57) ABSTRACT

A lamp includes a light source and a light pipe including a light transmissive medium with an elongated body extending along an axial axis. The light pipe has an input for receiving light from the light source and a plurality of prism optics extending into an outside surface of the elongated body in a direction of the axial axis, wherein the plurality of prism optics each has an angle in the range of about 115° (degrees) to 145° (degrees).

16 Claims, 6 Drawing Sheets

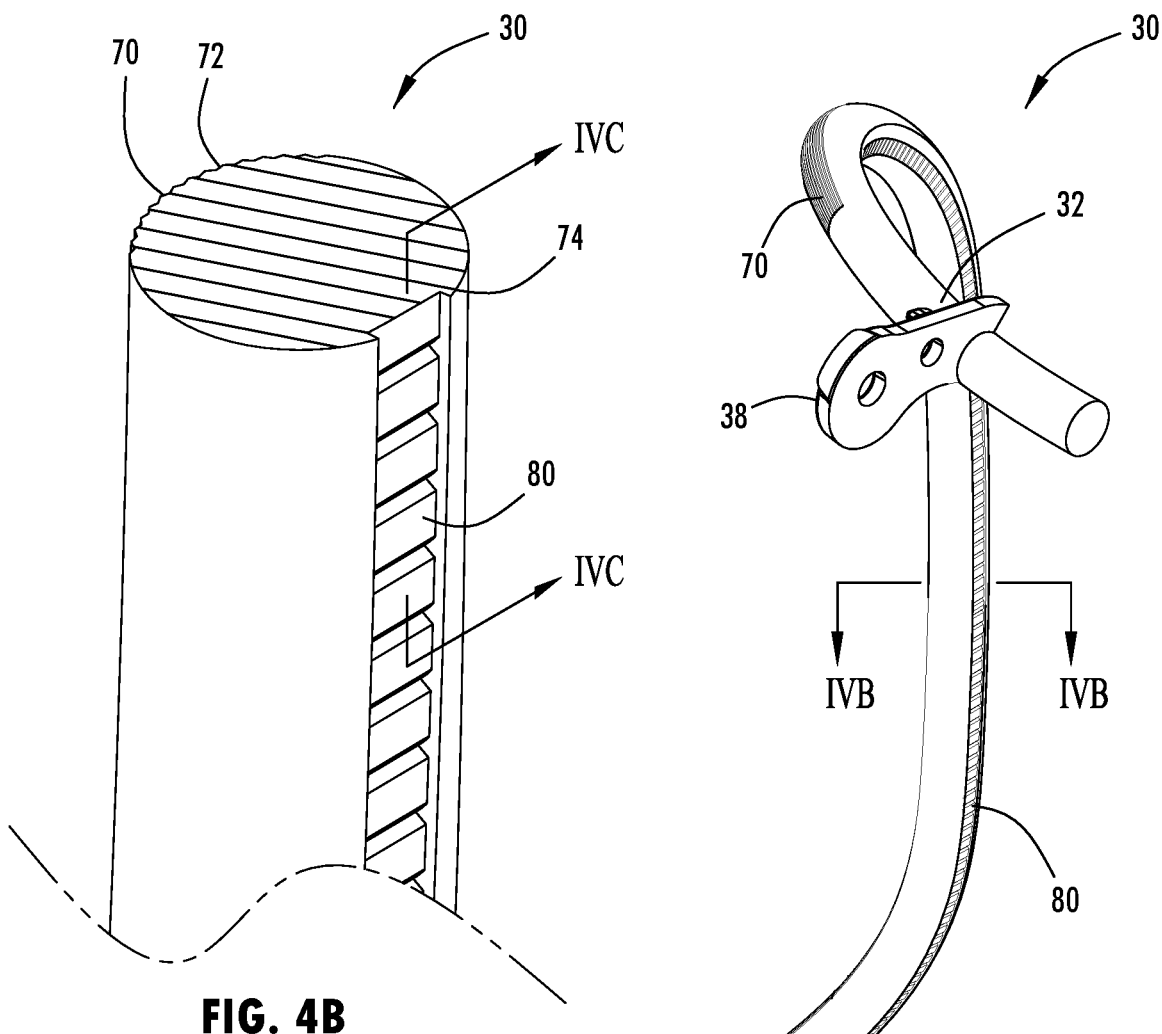
FIG. 4B
FIG. 4A
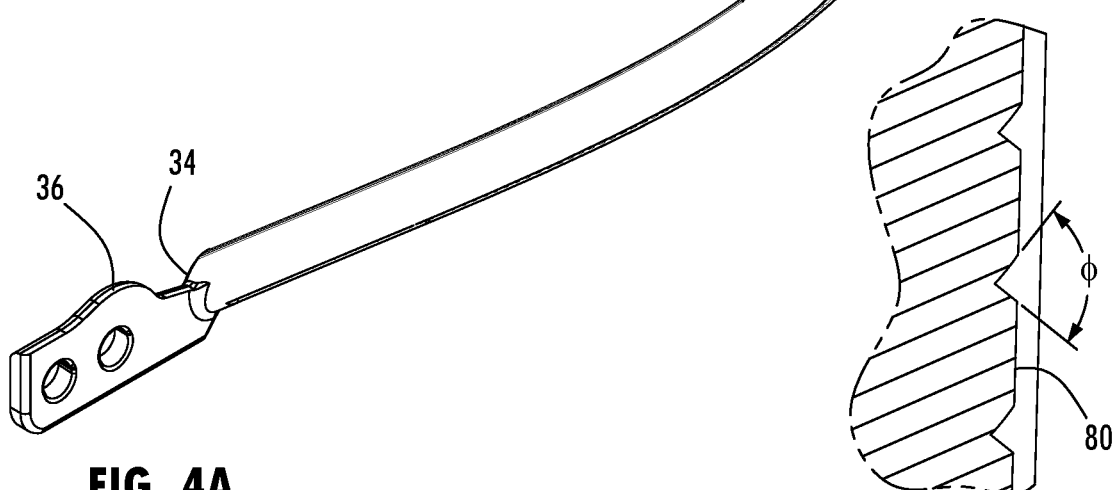
FIG. 4C

LAMP HAVING ILLUMINATING LIGHT PIPE WITH AXIAL ALIGNED PRISM OPTICS

FIELD OF THE DISCLOSURE

The present disclosure generally relates to a lighting devices, and more particularly relates to a lamp having a light guide with prism optics to achieve a uniform off angle light brightness.

BACKGROUND OF THE DISCLOSURE

Automotive vehicles are commonly equipped with various lighting devices. For example, vehicle exterior lamps may include daytime running lamps, brake lamps, signal lamps, taillamps, and other lighting devices. It may be desirable to provide for a lamp that provides a uniform off angle light brightness, particularly for use on a vehicle.

SUMMARY OF THE DISCLOSURE

According to a first aspect of the present disclosure, a lamp with a light source and a light pipe having a light transmissive medium with an elongated body extending along an axial axis, the light pipe having an input for receiving light from the light source and a plurality of prism optics extending into an outside surface of the elongated body in a direction of the axial axis, wherein the plurality of prism optics each has an angle in the range of about 115° (degrees) to 145° (degrees).

Embodiments of the first aspect of the present disclosure can include any one or a combination of the following features:
- the input is provided at one end of the light pipe;
- each of the plurality of prism optics has an angle in the range of about 120° (degrees) to 140° (degrees);
- each of the plurality of prism optics has an angle in the range of approximately 130° (degrees);
- each of the plurality of prism optics is formed with a generally V-shaped groove having the angle as an inclined angle;
- each prism optic has a V-shaped groove formed in a front surface of the light pipe, wherein additional prism optics having V-shaped grooves orthogonal to the axial axis and formed on a rear surface of the light pipe;
- the lamp comprises a connector configured to be installed on a motor vehicle;
- the lamp is configured to be installed as a daytime running lamp on the motor vehicle; and
- the light transmissive medium comprises at least one of PMMA and polycarbonate.

According to a second aspect of the present disclosure, a vehicle lamp with a connector configured to connect to a vehicle, a light source, and a light pipe having a light transmissive medium with an elongated body extending along an axial axis, the light pipe having an input for receiving light from the light source and a plurality of prism optics extending into an outside surface of the elongated body in a direction of the axial axis, wherein the plurality of prism optics each has an angle in the range of about 1150 (degrees) to 145° (degrees).

Embodiments of the second aspect of the present disclosure can include any one or a combination of the following features:
- the input is provided at one end of the light pipe;
- each of the plurality of prism optics has an angle in the range of about 120° (degrees) to 140° (degrees);
- each of the plurality of prism optics has an angle in the range of approximately 1300 (degrees);
- each of the plurality of prism optics is formed with a generally V-shaped groove having the angle as an incline angle;
- each prism optic has a V-shaped groove formed in a front surface of the light pipe with additional prism optics having V-shaped grooves orthogonal to the axial axis and on a rear surface of the light pipe;
- the lamp is configured to be installed on a front side of the vehicle;
- the lamp is configured to be installed as a daytime running lamp on the vehicle; and
- the light pipe comprises at least one of PMMA and polycarbonate.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4A is a rear elevated perspective view of a front light exiting side of the first light pipe shown in FIG. 3A;

FIG. 4B is a rear perspective cross-sectional view of the rear side of the first light pipe taken through lines IVB-IVB of FIG. 4A;

FIG. 4C is a cross-sectional view of a portion of the first light pipe taken through FIG. 4B.

DETAILED DESCRIPTION OF PREFERRED EMBODIMENTS

Figure 1A:
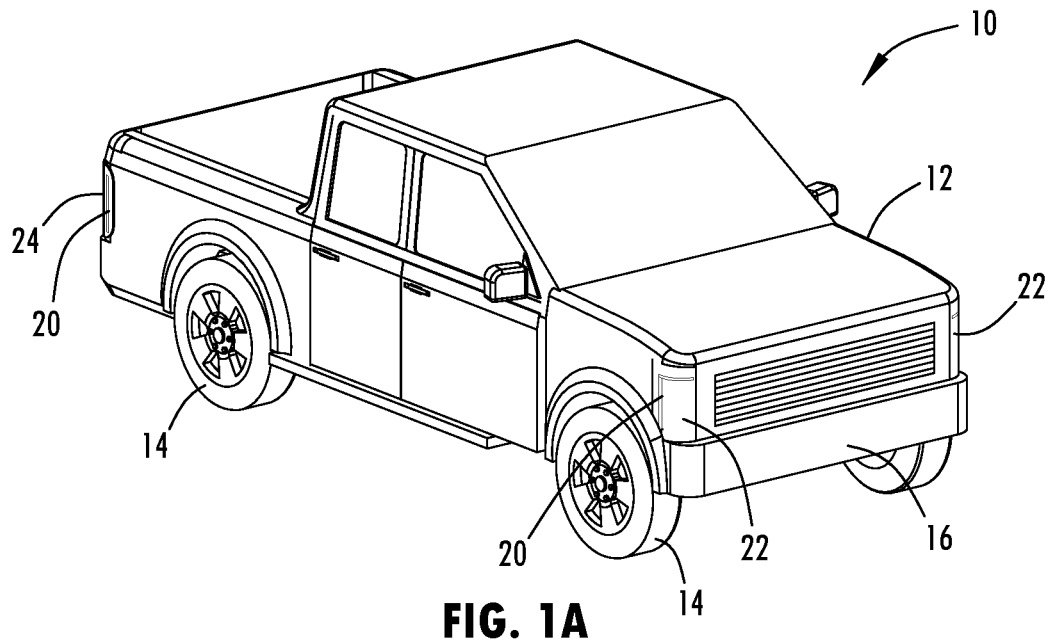
FIG. 1A is a front perspective view of a motor vehicle equipped with exterior lamps including daytime running lamps, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Figure 1B:
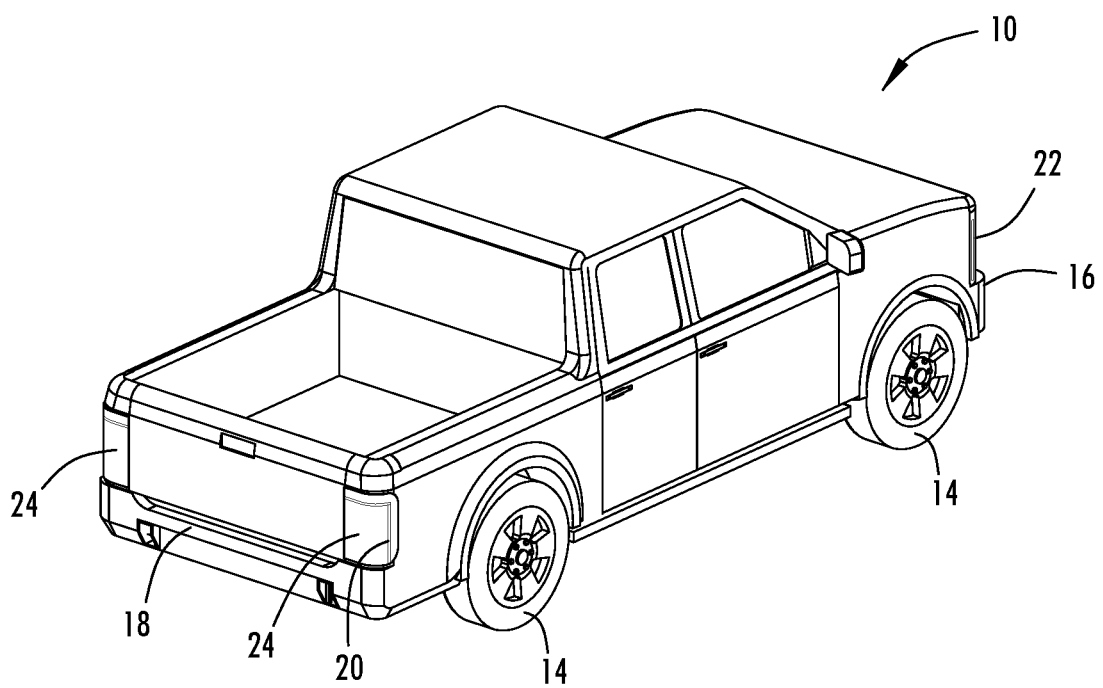
FIG. 1B is a rear perspective view of the motor vehicle equipped with exterior lamps including taillamps.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a lamp having a light pipe with axial aligned prism optics and a vehicle lamp. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, one example of a motor vehicle 10 is generally illustrated equipped with a plurality of light illumination lamps 20 generally shown located on the exterior at the front end 16 and rear end 18 of the motor vehicle 10. The plurality of lamps 20 in the example shown at the front end 16 of the motor vehicle 10 are configured as daytime running lamps (DRL), according to one example, which may be located within or proximate to the headlamps 22 located at the opposite front corners of the motor vehicle 10. The lamps 20 shown at the rear end 18 of the motor vehicle 10 may be located within or proximate to the taillamps 24 located at the opposite rear corners of the motor vehicle 10. In addition, it should be appreciated that the motor vehicle 10 may have a plurality of other lamps including brake lamps, signal lamps, taillamps, etc. that may be configured as shown and described herein. Each lamp 20 is configured as a light illumination lamp advantageously providing light illumination with substantially uniform light brightness as seen from various viewing angles or directions, such as during the day or during times of darkness. The daytime running lamp, for example, may provide a continuous light illumination that is generally viewable from different angles, including left and right side viewing angles when viewing the motor vehicle 10.

Figure 2:
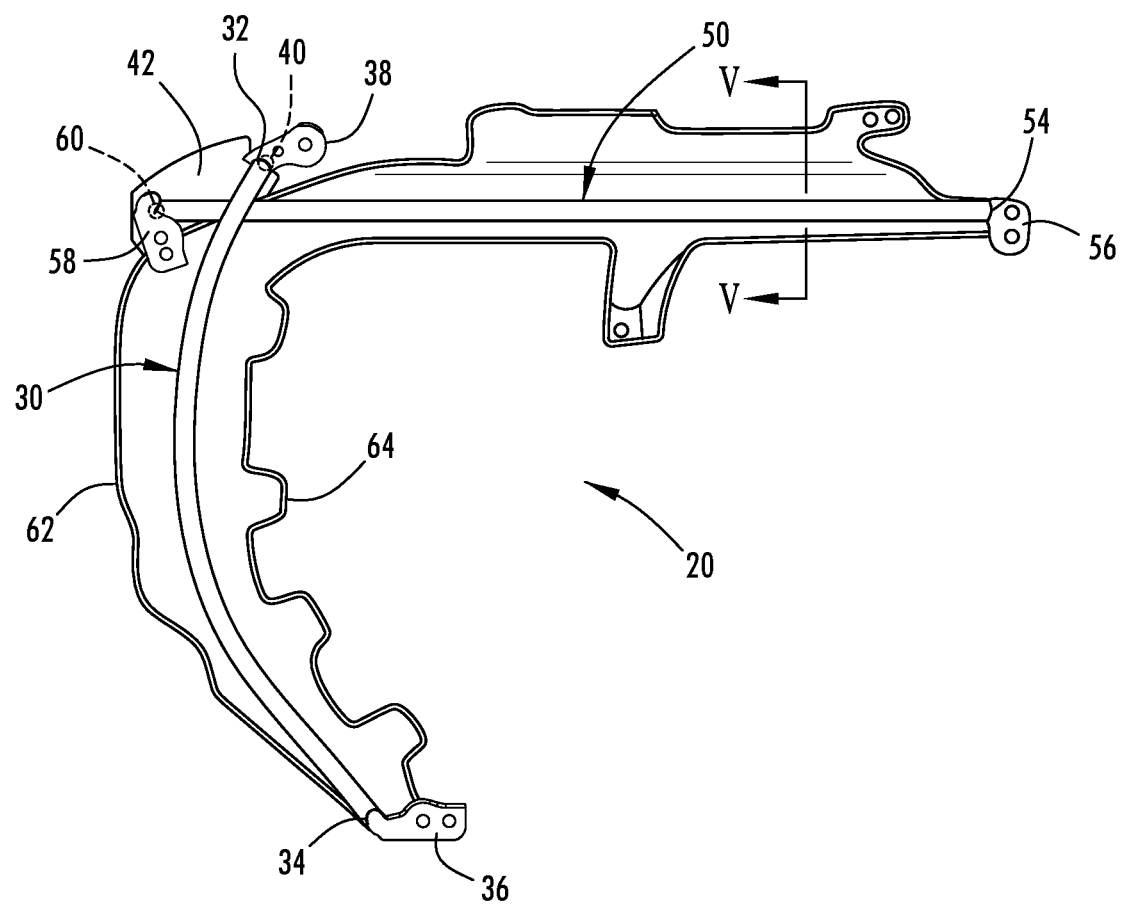
FIG. 2 is a front view of a daytime running lamp with a first light pipe having prism optics configured with V-shaped prisms extending along an axial axis, according to one embodiment.

Each lamp 20 may be configured the same as or similar to the daytime running lamp shown in FIG. 2. Each lamp 20 may include an illuminated optical light guide system that includes a vertical or first light pipe 30 generally shown oriented vertically along at least a portion of a lateral side of the lamp 20 and a horizontal or second light pipe 50 extending generally horizontal along a top side of the lamp 20. The first light pipe 30 extends vertically in the example shown, but may extend in other directions according to various other examples. The second light pipe 50 extends horizontally in the example shown, but may extend in other directions according to various other examples. The first and second light pipes 30 and 50 are positioned within a housing which in turn are connected to the motor vehicle 10. Each of the first and second light pipes 30 and 50 is a light guide that has an input end operatively coupled to a light source for receiving light which is transmitted throughout and emitted from the light pipe. It should be appreciated that the light source may include one or more light emitting diodes (LED). According to one example, light emitting diodes may include RGB (red-green-blue) diodes that may generate any of a plurality of light colors.

The lamp 20 is illustrated in FIG. 2 generally having a housing including a first side housing 62 on the left side and a second side housing 64 on the right side that connect together to define an interior. Disposed within the interior of the housing is the vertical first light pipe 30 and the horizontal second light pipe 50. The first and second light pipes 30 and 50 are light transmitting and illuminating light guides that distribute and emit light generally from the front side throughout a lengthwise portion. The first light pipe 30 is shown generally extending vertically, and the second light pipe 50 is shown generally extending horizontally, in the example shown. The first light pipe 30 is connected to a lower first mount 36 and an upper second mount 38. The first and second mounts 36 and 38 support the first light pipe 30 and may connect the lamp 20 to the motor vehicle 10. The first light pipe 30 has a first end 32 coupled proximate to the second mount 38, and a second end 34 coupled proximate to the first mount 36. A first light source 40, which may include a light emitting diode (LED) or a plurality of LEDs is optically coupled to the first end 32 of the first light pipe 30 to input light into the first end 32 of the first light pipe 30 which is then transmitted throughout and substantially uniformly emitted along the length of the first light pipe 30.

The second light pipe 50 includes a first end 52 coupled proximate to a first mount 58 and a second end 54 coupled proximate to a second mount 56. The first and second mounts 58 and 56 support the second light pipe 50 and may connect the lamp 20 to the motor vehicle 10. A second light source, such as a light emitting diode 60 or a plurality of LEDs, is optically coupled to the first input 52 to input light into the second light pipe 50 to be transmitted throughout and emitted from the front side along the length of the second light pipe 50.

The first and second light sources 40 and 60 may be mounted onto a printed circuit board 42. The printed circuit board 42 may include electrical circuitry for receiving electrical power, converting the electrical power to a suitable voltage such as a pulse-width modulated (PWM) voltage and supplying the converted electrical power at the suitable voltage to the corresponding first and second light sources 40 and 60 to power the first and second light sources 40 and 60 to generate light.

In the example shown, the first light pipe 30 extends generally vertically along a left side of the lamp 20, and the second light pipe 50 extends generally horizontally along a top side of the lamp 20. It should be appreciated that the first and second light pipes 30 and 50 may be otherwise oriented in different directions along different axes in different directions, according to other examples.

Figures 3A, 3B:
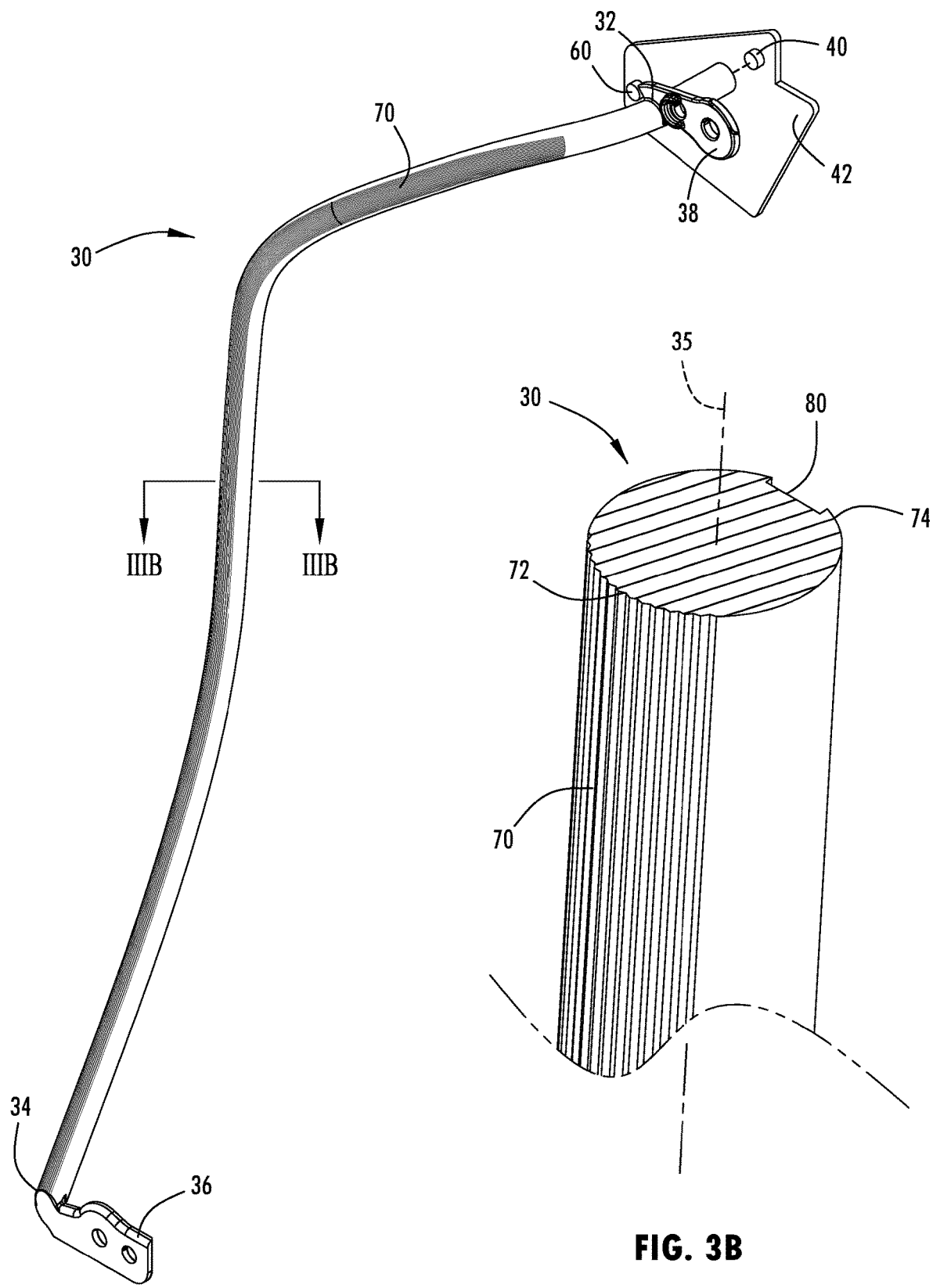
FIG. 3A is an elevated front perspective view of the first light pipe illustrating the axial extending prism optics.
FIG. 3B is a sectional view of the first lighted pipe taken through lines IIIB-IIIB of FIG. 3A.
Figure 3C:
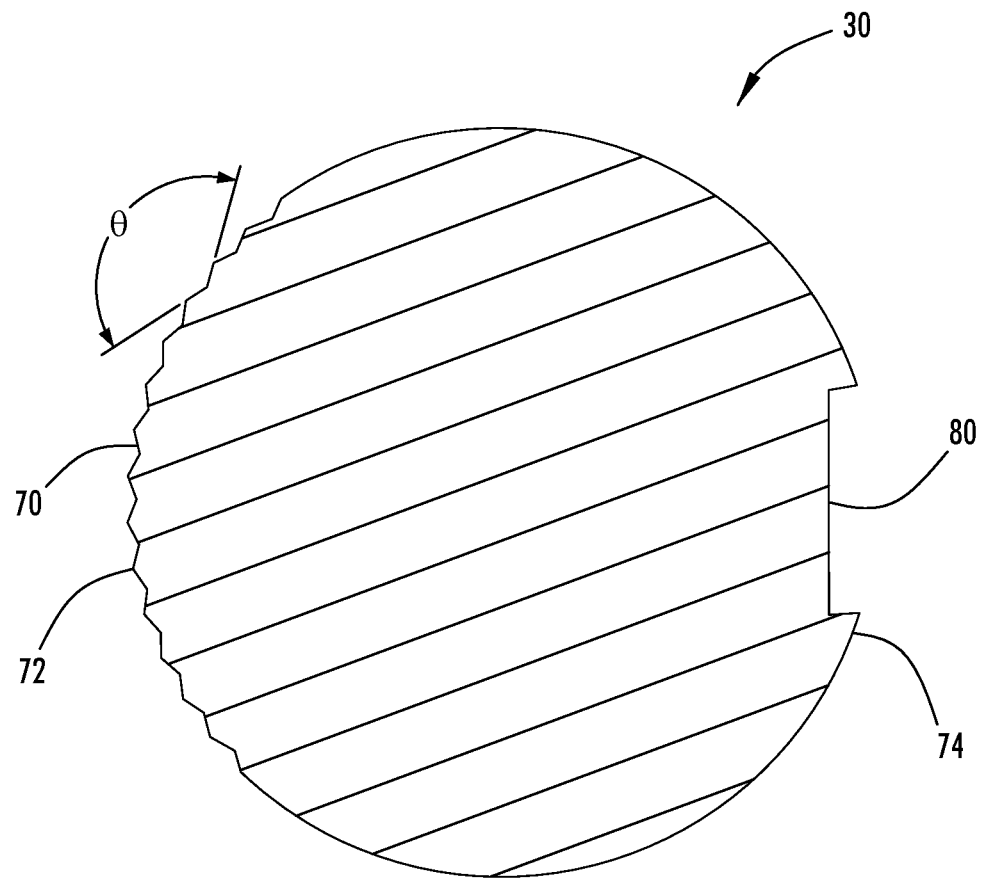
FIG. 3C is an end view of the first light pipe shown in FIG. 3B.

Referring to FIGS. 3A-3C, the first light pipe 30 is illustrated generally extending along an axial axis 35 that extends lengthwise between the first end 32 and the second end 34. The axial axis 35 may vary in direction along the length of the first light pipe 30, as the first light pipe 30 may have at least one bend. The first light pipe 30 includes a generally cylindrical body that is generally made of a light transmissive medium operatively configured to receive light and to transit and distribute the reflected and refracted light throughout the first light pipe 30. The first light pipe 30 has a length which extends along the axial axis 35 and a width that may vary depending on the diameter of the first light pipe 30. The first light pipe 30 will be made of a light transmissive medium having a high index of refraction in the range of about 1.4 to 1.7, according to one example. The light transmissive medium may include a transparent and rigid plastic such as polymethacrylate (PMMA), which is a synthetic resin produced from the polymerization and methacrylate and has an index of refraction of about 1.49, according to one example. According to another example, the light transmissive medium may include a thermoplastic polymeric, such as polycarbonate having an index of refraction of about 1.59. The light pipe 30 may be formed in a mold using injection molding and may be rigid or flexible depending on the thickness.

The first light pipe 30 is formed to include a series of parallel aligned prism optics 70 which generally extend in a periodic arrangement along the axial axis 35 on a portion of an outer surface of the first light pipe 30. The first light pipe 30 has a generally cylindrical body with the series of V-shaped grooves forming the prism optics 70 on a front first side 72 on the outer surface thereof. The V-shaped grooves result in a sawtooth configuration formed in the outer surface of the first light pipe 30. The V-shaped grooves forming the prism optics 70 have an angle θ in the range of 115 degrees to 145 degrees, according to one embodiment. According to a specific exemplary embodiment, the plurality of V-shaped prisms 70 each has an angle θ in the range of about 130 degrees. By providing an angle θ in the range of 115 degrees to 145 degrees, or more specifically of about 130 degrees, light generated by the light source that is transmitted towards the prism optics 70 is emitted from the front side surface in a substantially uniform brightness through a wide range that can be seen at different angles offset from the center viewing of the first light pipe 30. The brightness from the first light pipe 30 can be comparable or match the brightness from the second light pipe 50 when viewing from off angle.

Referring to FIGS. 4A-4C, opposite the front first side 72 of the first light pipe 30 is a rear second side 74 which has a plurality of horizontal prism optics 80 formed therein. The horizontal prism optics 80 extend orthogonal to the axial axis 35 and may be formed with V-shaped grooves formed in out surface of the light pipe body that extend in series along the length of the first light pipe 30. The horizontal prism optics 80 may have an angle φ in the range of about 30 degrees to 90 degrees, more specifically in the range of about 45 degrees to 75 degrees. It should be appreciated that light transmitted through the first light pipe 30 is redirected from the rear second side 74 via the horizontal prism optics 80 toward the front first side 72 with the axial aligned prism optics 70.

Figure 5:
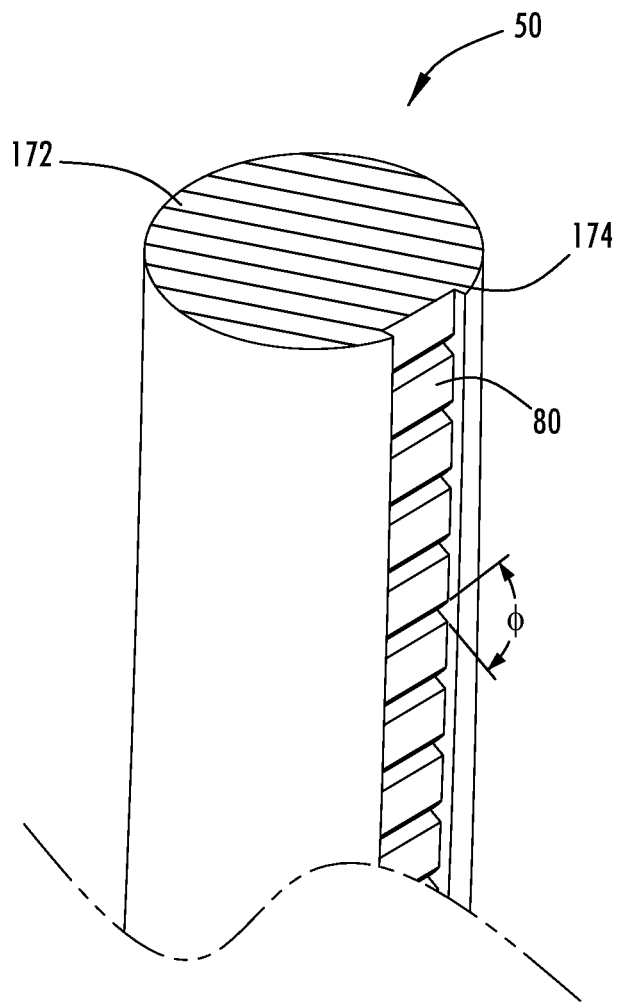
FIG. 5 is a rear perspective cross-sectional view of the second light pipe.

The second light pipe 50, which is shown in FIG. 5, may likewise be made of a light transmissive medium having a high index of refraction in the range of about 1.4 to 1.7, according to one example. The light transmissive medium may include a transparent and rigid plastic such as polymethacrylate (PMMA), which is a synthetic resin produced from the polymerization and methacrylate and has an index of refraction of about 1.49, according to one example. According to another example, the light transmissive medium may include a thermoplastic polymeric such as polycarbonate having an index of refraction of about 1.59. The light pipe 50 may be formed in a mold using injection molding. Similar to the first light pipe 30, the second light pipe 50 has a plurality of horizontal prism optics 80 that are orthogonal to the axial axis 35 and generally formed in a rear side 174 of the second light pipe 50. The horizontal prism optics 80 redirect the light transmitted through the second light pipe 50 forward to the front surface to be viewable from the front side 172 of the second light pipe 50. It should be appreciated that the horizontal prism optics 80 may likewise have V-shaped grooves with an angle φ there between in the range of 30 degrees to 90 degrees, more specifically in the range of about 45 degrees to 75 degrees, according to one example.

It should be appreciated that the lamp 20 advantageously employs a first light pipe 70 having a plurality of axial aligned prism optics 70 to advantageously distribute the light with an even brightness from different viewing angles. The lamp 20 may advantageously be employed on a motor vehicle 10 such as for use as a daytime running lamp, for example. The lamp 20 may further be employed on other areas of the motor vehicle 10, such as in the taillamp, for example. It should be appreciated that the lamp 20 may further be installed in other locations, both on and off motor vehicles 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A lamp comprising:
   a light source; and
   a light pipe having a light transmissive medium with an elongated body extending along an axial axis, the light pipe having an input for receiving light from the light source and a plurality of prism optics extending into an outside surface of the elongated body in a direction of the axial axis, wherein the plurality of prism optics each has an angle in the range of about 115° (degrees) to 145° (degrees), wherein each prism optic has a V-shaped groove formed in a front surface of the light pipe, and further comprising additional prism optics having V-shaped grooves orthogonal to the axial axis and formed on a rear surface of the light pipe.

2. The lamp of claim 1, wherein the input is provided at one end of the light pipe.

3. The lamp of claim 1, wherein each of the plurality of prism optics has an angle in the range of about 120° (degrees) to 140° (degrees).

4. The lamp of claim 3, wherein each of the plurality of prism optics has an angle in the range of approximately 130° (degrees).

5. The lamp of claim 1, wherein each of the plurality of prism optics is formed with a generally V-shaped groove having the angle as an inclined angle.

6. The lamp of claim 1, wherein the lamp comprises a connector configured to be installed on a motor vehicle.

7. The lamp of claim 6, wherein the lamp is configured to be installed as a daytime running lamp on the motor vehicle.

8. The lamp of claim 1, wherein the light transmissive medium comprises at least one of PMMA and polycarbonate.

9. A vehicle lamp comprising:
   a connector configured to connect to a vehicle;
   a light source; and
   a light pipe having a light transmissive medium with an elongated body extending along an axial axis, the light pipe having an input for receiving light from the light source and a plurality of prism optics extending into an outside surface of the elongated body in a direction of the axial axis, wherein the plurality of prism optics each has an angle in the range of about 115° (degrees) to 145° (degrees), wherein each prism optic has a V-shaped groove formed in a front surface of the light pipe, and further comprising additional prism optics having V-shaped grooves orthogonal to the axial axis and on a rear surface of the light pipe.

10. The vehicle lamp of claim 9, wherein the input is provided at one end of the light pipe.

11. The vehicle lamp of claim 9, wherein each of the plurality of prism optics has an angle in the range of about 120° (degrees) to 140° (degrees).

12. The vehicle lamp of claim 11, wherein each of the plurality of prism optics has an angle in the range of approximately 130° (degrees).

13. The vehicle lamp of claim 9, wherein each of the plurality of prism optics is formed with a generally V-shaped groove having the angle as an incline angle.

14. The vehicle lamp of claim 9, wherein the lamp is configured to be installed on a front side of the vehicle.

15. The vehicle lamp of claim 14, wherein the lamp is configured to be installed as a daytime running lamp on the vehicle.

16. The vehicle lamp of claim 9, wherein the light pipe comprises at least one of PMMA and polycarbonate.

* * * * *